United States Patent
Oehrle et al.

(10) Patent No.: US 11,585,336 B2
(45) Date of Patent: Feb. 21, 2023

(54) LAMINATED MEMBRANE FOR MEMBRANE PUMP

(71) Applicants: Joachim Oehrle, Herrenberg (DE); Leon Radom, Ellhofen (DE)

(72) Inventors: Joachim Oehrle, Herrenberg (DE); Leon Radom, Ellhofen (DE)

(73) Assignee: ULMAN DICHTUNGSTECHNIK GMBH, Gaertringen (DE)

( * ) Notice: Subject to any disclaimer, the term of this patent is extended or adjusted under 35 U.S.C. 154(b) by 0 days.

(21) Appl. No.: 17/480,353

(22) Filed: Sep. 21, 2021

(65) Prior Publication Data
US 2022/0099082 A1    Mar. 31, 2022

(30) Foreign Application Priority Data
Sep. 30, 2020   (DE) .......................... 102020125567.5

(51) Int. Cl.
*F04B 43/02*   (2006.01)
*F04B 43/00*   (2006.01)

(52) U.S. Cl.
CPC .......... *F04B 43/02* (2013.01); *F04B 43/0054* (2013.01)

(58) Field of Classification Search
CPC ...... F04B 43/02; F04B 43/0054; F04B 43/00; F04B 43/0009
See application file for complete search history.

(56) References Cited

U.S. PATENT DOCUMENTS

| | | | |
|---|---|---|---|
| 2003/0110939 A1* | 6/2003 | Able | F04B 43/0054 92/98 R |
| 2011/0311379 A1 | 12/2011 | Hale | |
| 2018/0045190 A1* | 2/2018 | Ezzo | F04B 45/043 |

* cited by examiner

*Primary Examiner* — Philip E Stimpert
(74) *Attorney, Agent, or Firm* — Andrew Wilford

(57) ABSTRACT

A diaphragm for a pump has a one-piece elastomeric body centered on an axis and formed with an annular outer clamping edge, an annular flexible web extending radially inward from the outer edge, and a core joined by the web to the outer edge and formed in turn by an upper wall and a lower wall axially spaced therefrom. This lower wall is formed on the axis with a throughgoing hole. An insert between the walls extends through the hole, and interengaging formations on the insert and on the lower wall radially couple the insert to the lower wall at an inner edge of the hole.

11 Claims, 2 Drawing Sheets

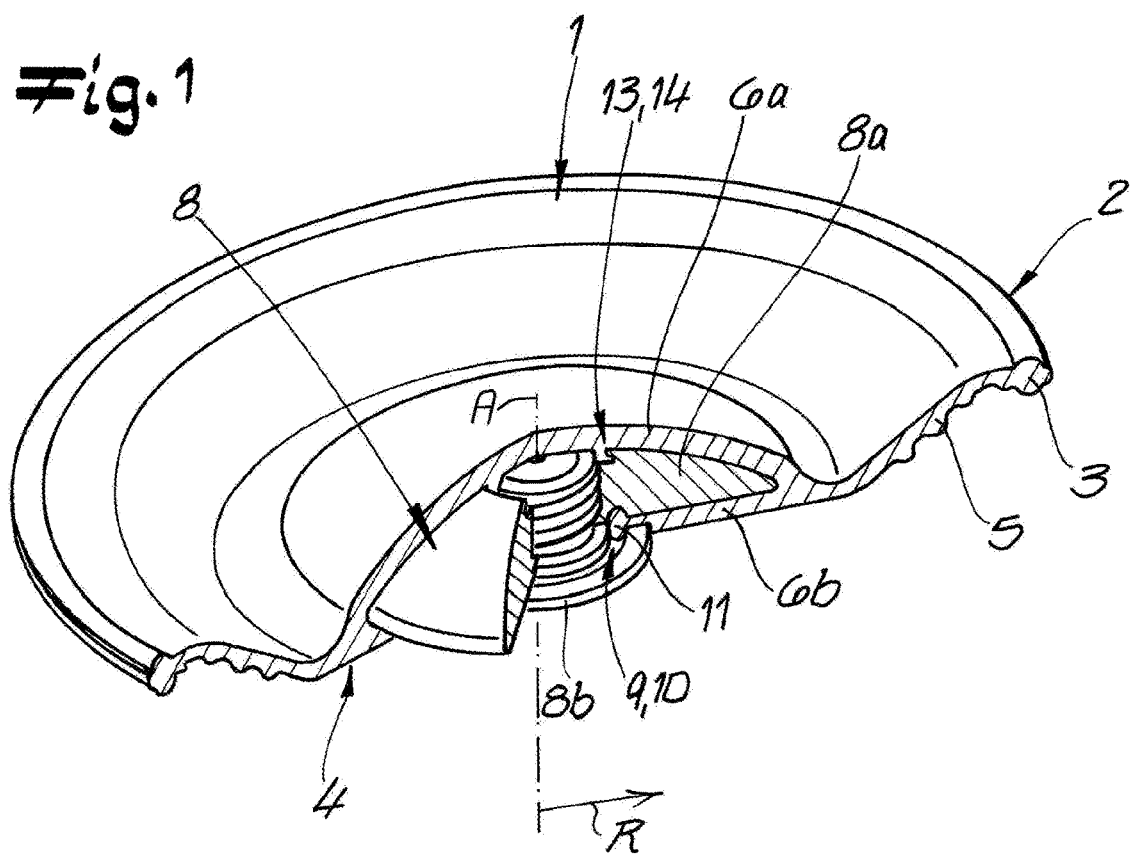
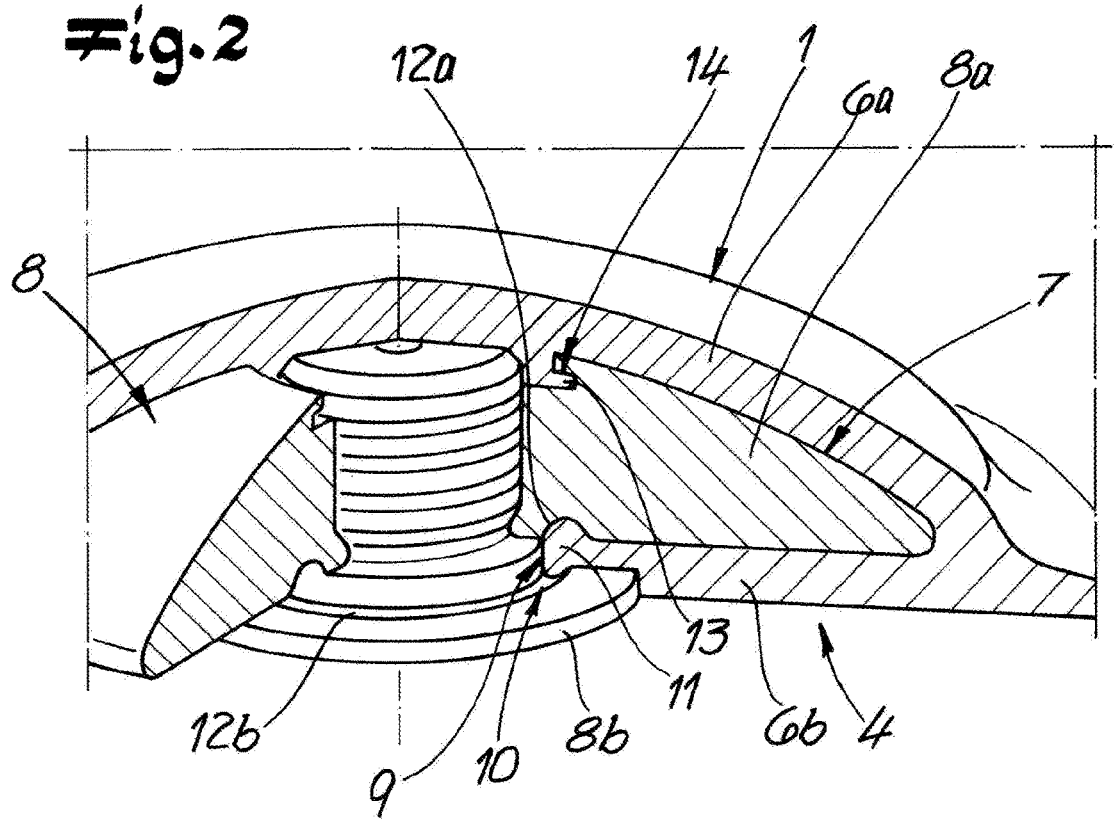

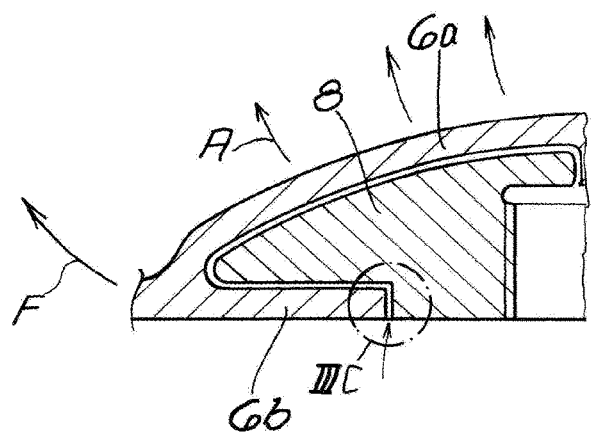
Fig. 3A - Prior Art
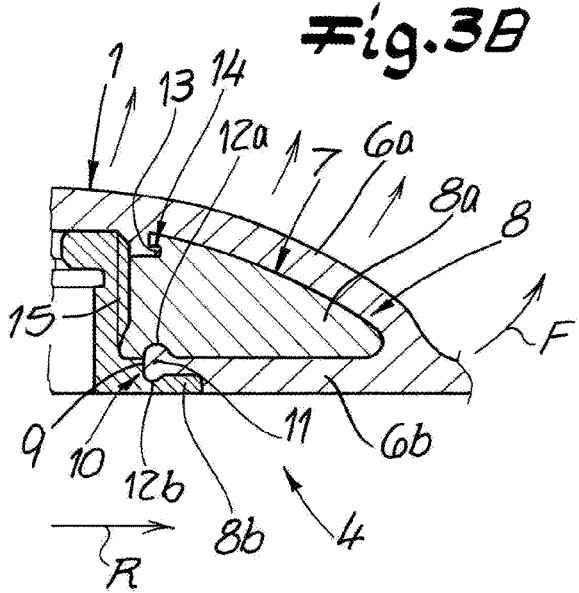
Fig. 3B
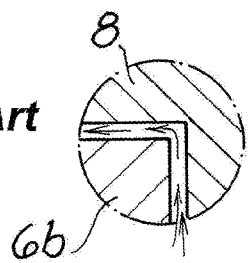
Fig. 3C - Prior Art
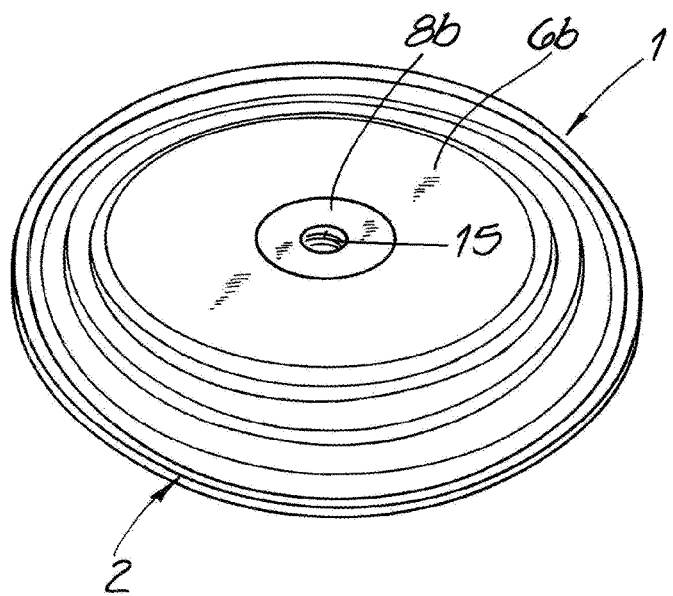
Fig. 4

LAMINATED MEMBRANE FOR MEMBRANE PUMP

FIELD OF THE INVENTION

The present invention relates to a membrane for a membrane pump.

BACKGROUND OF THE INVENTION

A membrane pump or the like typically has a laminated membrane having an annular elastomeric body whose outer edge is formed with a clamping bead, and that also has a core connected to an inner edge of the elastomeric body. A flexible part of the membrane connects the outer clamping bead to the core and typically has an upper and a lower wall that together flank an insert.

Laminated membranes of this type can be used, for example, for force conversion of differential pressures, especially with servo elements, actuators, brake or steering boosters or the like. They can also be used in pressure reducers, pressure regulators or flow regulators. In addition, they are also suitable for use as a valve, for example, as a pressure relief valve, safety valve, shut-off valve, or check valve.

Such laminated membranes are preferred, however, for use in pumps, for example, metering pumps, mechanical pumps, membrane compressors or vacuum pumps. Especially they are suitable for use in diaphragm pumps, e.g. air operated diaphragm pumps.

Such laminated membranes are usually circular and have a flat dish shape. With this in mind, they are also called dish membranes. However, the invention is not limited to such refinements but also relates to rolling diaphragms, beaded diaphragms, spherical diaphragms and flat membranes.

The laminated membrane can be clamped at the edge in a membrane pump, while the core of the laminated membrane is reciprocated vertically so that with each lifting movement the flexible diaphragm section is inverted by deformation of the membrane between the core and the clamped outer edge. Hitherto such movement has been characterized as a rolling action.

The insert in the core is in contrast to the elastomeric body formed from an rigid or dimensionally stable material, so that the core itself does not take part in the rolling movement but is attached to the piston rod transfers the stroke movements to the flexible material. For this purpose is the insert placed between the upper and lower walls, with the top wall on facing the medium to be conveyed when used as intended. Correspondingly, when used as intended, the rear wall faces away from the medium.

The elastomeric body usually has a media-side support formed of polytetrafluoroethylene (PTFE) for chemical resistance with respect to the medium being pumped.

The elastomeric body is formed from an elastomer, usually rubber, and the insert is vulcanized to the elastomeric body for best mounting. To simplify this manufacturing process, thermoplastic elastomers (TPE) are increasingly being used for the elastomeric body. These are polymers that are elastomeric in their normal states. However, they can be plastically deformed by heat to assume almost any desired shape.

US 2011/0311379 describes how the elastomeric body of thermoplastic elastomer is injection-molded around an insert. However, it is particularly important when integrating thermoplastic elastomers that these materials bond with the insert that is usually made of metal without additional chemical adhesive system. Especially with big diaphragms, the high surface forces and loads the elastomeric body of thermoplastic elastomer detaches from the insert. This problem also arises in principle with other plastic materials, although and is particularly problematic in the case of thermoplastic elastomers.

Separation of the elastomeric body can also be caused by pressurized air getting into the gap between the insert and the elastomeric body, as a result of which the above-described separation is accelerated even further and leads, for example, to complete disconnection.

According to US 2011/0311379, this problem can be solved in that the elastomeric body made of thermoplastic elastomer is attached by an additional adhesive layer to the insert. In addition, the insert has openings into which the liquid elastomer is injected in the course of production, so that in particular radial forces can be balanced to a certain extent. But these openings do not prevent compressed air from penetrating into the area between the elastomeric body and the openings that can lead to a reduction in the amount of air. Thus, without the additional adhesive layer, it is not possible to create a permanent bond between the elastomeric body and the insert.

OBJECTS OF THE INVENTION

It is therefore an object of the present invention to provide an improved laminated membrane for a membrane pump.

Another object is the provision of such an improved laminated membrane for a membrane pump that overcomes the above-given disadvantages, in particular that avoids the extra production step of working with an adhesive while ensuring a very solid connection of the membrane to the insert.

SUMMARY OF THE INVENTION

A diaphragm for a pump has according to the invention a one-piece elastomeric body centered on an axis and formed with an annular outer clamping edge, an annular flexible web extending radially inward from the outer edge, and a core joined by the web to the outer edge and formed in turn by an upper wall and a lower wall axially spaced therefrom. This lower wall is formed on the axis with a throughgoing hole. An insert between the walls extends through the hole, and interengaging formations on the insert and on the lower wall radially couple the insert to the lower wall at an inner edge of the hole.

The positive connection in the seal region ensures that forces acting radially on the elastomeric body are to a large extent or completely resisted by the form fit between the insert and the elastomeric body. This prevents separations of the elastomeric body from the insert and thus detachment of the elastomeric body from the insert.

At the same time, the tight fit between the insert and the elastomeric body formed in the seal region effectively reduces or completely prevents the entry of compressed air. Since the hole is usually in the center or is aligned with a central axis of the circular laminated membrane, the seal region is also immediately next to the hole, so that the entry of compressed air can be prevented at its normal entry point. It should be noted that the gap between the insert and the elastomeric body, starts at the hole.

In order to achieve a form fit and at the same time the most effective possible seal, according to a preferred embodiment, the lower wall has in the seal region a thickened edge that surrounds the hole and that is received on both sides in a respective circumferential groove of the insert. It should be noted that by the elastomeric body is gripped by the insert rests on both sides, namely between an axially confronting annular grooves formed in the insert, and the inner edge of the lower wall is gripped between them.

The interfit of this thickened edge with the annular axially open grooves provides a positive fit. The grooves are open axially toward each other and thus effectively inhibit movement in the radial direction of the lower wall of the elastomeric body relative to the insert. At the same time, however, an additional seal is also achieved in that air must move along the interface between the lower wall and the insert around the thickened edge in order to get into the area of the insert between the walls of the elastomeric body and thereby detach it from the elastomeric body. In face, air forced in under the edge thickening or bead simply serves to press the inner edge of the lower wall more tightly against the insert, thereby increasing the sealing effect. In this context, one can therefore also speak of an "active seal geometry" because the acting sealing forces increase with increasing entry of compressed air and thus the sealing effectiveness also increases.

A particularly preferred embodiment entails the provision of inner and outer insert parts. The outer part lies essentially and preferably completely within the space between the upper and lower walls of the elastomeric body and the inner part bears against the lower wall or preferably engages around the inner edge of the lower wall at the hole. The two-part design of the insert ensures an excellent form fit between the insert and the elastomeric body in a simple manner. For example, it is possible that the outer insert part is overmolded with the elastomer of the elastomeric body. The inner insert part insert can then be fitted to the lower side of the core and fastened to the outer insert part. The inner insert part ensures that the lower wall, mainly its inner edge bead, is gripped between the inner and outer insert parts in the circumferential grooves of the outer and inner insert parts.

Alternatively, the insert parts can also first be mounted on each other and the elastomeric body is then injected molded to them. The molten elastomer penetrates into the space between the insert parts, so that the insert parts in particular form an injection mold, so that the edge bead can correspondingly be shaped perfectly on the elastomeric body.

The design of the two-part insert can basically be implemented in different ways. For example, the outer insert part can be completely between the walls of the elastomeric body, and the inner insert part body then is of T-shape with an axially extending center stem extending through the hole and an edge flange bearing upward on the inner edge of the lower wall. Alternatively, the outer insert part can also extend past an upper side of the lower wall that rests on the insert, so that the inner insert part is then shaped as a disk.

The two insert parts are connected to each other in a known manner via a screw connection, a press fit or a form fit, in the case of the screw connection there is a bore extending along the central axis or an opening of the outer part with an internal thread and then a T-shaped inner insert part with an external thread running in the axial direction is screwed into the internal thread of the outer insert part. This opening is preferably the only opening in the outer insert part. Further openings or cutouts can be provided outside the central axis to reduce the weight of the insert part. The elastomeric body does not have in the area of the core any additional walls or webs that form openings in the outer insert part.

The design of the chamber or the walls of the core depends according on the shape of the insert or of the outer insert part that preferably has a semi-ellipsoidal or disc-shaped basic shape. More particularly, it has a partially elipsoidal or spherical upper surface and a basically flat or planar lower face and is complementary to the inner surfaces of the upper and lower walls of the elastomeric body.

In order to prevent separation of the upper wall from the upper surface of the insert, for instance caused by a negative pressure axially lifting the upper wall, formations are provided that axially couple the upper wall to the outer insert part. The upper wall of the elastomeric body and the outer insert part are provided with complementary interfitting formations that lock transversely or radially together and resist axial separation effectively.

This can be done according to a preferred design by providing the insert with a radially projecting formation that fit complementarily with one or more radially oppositely projecting or opening formations. The formations of the elastomeric body can be a single annular inwardly projecting ridge or a row of teeth that, when fitted together, inhibiting relative axial or vertical movement of the insert and elastomeric body.

The insert preferably also contains a connection device for a piston rod, which in particular in the case of a two-part design is provided in the inner insert part. Basically, this connection can be a screw connection, a press fit or a form fit, but a screw connection is preferred, since the piston rod is so simple and can thus be detachably connected to the laminated membrane. The connector is in the case of a two-part configuration preferably provided in the inner insert part body, in that the axially extending stem of the inner insert part has at least one internal thread into which the piston rod is screwed with its complementary external thread. In principle, however, it is also it is conceivable that the internal thread is provided in the outer insert part.

The form-fitting connection between the insert and the elastomeric body can, in particular when embodied as an active interfitting formations, be advantageously created when the elastomeric body is preferably made of a thermoplastic polymer (TPE). The insert or the insert parts are preferably made of a metal such as aluminum, copper, or steel, especially stainless steel.

BRIEF DESCRIPTION OF THE DRAWING

The above and other objects, features, and advantages will become more readily apparent from the following description, reference being made to the accompanying drawing in which:

FIG. 1 is a partly sectional perspective view of the membrane according to the invention;

FIG. 2 is a large scale view of a detail of FIG. 2;

FIG. 3A is a partial section through a diaphragm according to the prior art;

FIG. 3B is a view like FIG. 3A but showing the instant invention;

FIG. 3C is a large-scale view of the detail indicated at IIIC of the prior art of FIG. 3A; and FIG. 4 is a bottom isometric view of the invention.

SPECIFIC DESCRIPTION OF THE INVENTION

FIG. 1 shows the laminated membrane formed in one piece centered on an axis A as a dished elastomeric disk or body 1 having an annular and circular-section outer-edge bead 2 forming a clamping surface 3. The body 1 also has a center portion or core 4 and a flexible annular web 5 connecting the peripheral edge 2 to the core 4.

The core 4 is formed from an upper and a lower wall 6a and 6b that together define a chamber 7 holding a rigid annular insert 8 between the walls 6a and 6b and having a part-spherical upper surface and a generally planar lower face. The insert 8 extends through a circular axially centered hole 9 in the lower wall 6b and engages with a seal region 10 around an inner periphery of the lower wall 6b. This positively connects the insert 8 and the lower wall 6b at the seal region 10 with respect to one another in a radial direction r.

Details of the positive connection are shown in FIG. 2 where only the core 4 of the laminated body 1 is shown. It can be clearly seen here that the lower wall 6b has a thickened inner edge 11 surrounding the hole 9 and fitting into a downwardly open annular groove 12a and an upwardly open annular groove 12b of the insert 8.

How such a sealing structures functions is best understood by comparison with the prior-art system shown in FIGS. 3A and 3C. It should be noted that here too only the core 4 is shown. Due to the stroke movement of the laminated membrane, forces f are produced that are mainly radial and in the case of the prior-art laminated membrane of FIG. 3A lead mainly to spreading or separation of the elastomeric body 1 and the insert 8. This creates a gap between these two parts, into which compressed air can penetrate, as clearly evident from the detail view of FIG. 3C. At the same time surface forces A (FIG. 3A) are also effective that in particular cause the upper wall 6a to detach from the insert 8. As a result, the gap between them becomes larger and larger, so that compressed air penetrates into wide areas between insert 8 and elastomeric body 1 and can lead to component failure.

With this invention the positive connection in the seal region 10, even when subjected to the radial force f, ensures a solid connection between the insert 8 and the elastomeric body 1, so no gap for entry of the compressed air is formed. At the same time, the thickened edge bead 11 acts together with the circumferential grooves 12a and 12b as an active sealing structure, so that entry of air is blocked at the outermost part of the interface between the insert 8 and the elastomeric body 1.

In addition, to inhibit separation of the upper wall 6a from the insert 8 caused by the surface forces A, the insert 8 and the upper wall 6a are formed with interengaging formations 13 and 14 constituted by a radially outwardly projecting annular lip 13 on the wall 6a and an inwardly open complementarily annular groove 14 on the inner periphery of the body 8 into which this lip 13 fits.

FIGS. 1 and 2 also clearly that the insert 8 is formed by two parts, namely a doughnut-shaped or annular part 8a formed with the grooves 12a and 14 and a T-shaped core part 8b having an externally threaded stem extending axially up through the hole 9 in the outer part 8a and in fact screw-threaded into an internally threaded hole of the outer part 8a, and a flat disk-like flange formed with the groove 12b and set flush in the lower wall 6b. Here, the seal region 10 of the lower wall 6b is compressed between the flange of the core part 8b and the lower face of the part 8a to lock the bead 11 in place.

FIG. 4 also shows how the core part 8b has an internal thread 15 for connection to a piston rod and the lower face of the part 8b is flush with the lower face of the wall 6b.

We claim:

1. A diaphragm for a pump comprising:
   a one-piece elastomeric body centered on an axis and formed with
   an annular outer clamping edge,
   an annular flexible web extending radially inward from the outer edge, and
   a core joined by the web to the outer edge and formed in turn by an upper wall and a lower wall axially spaced therefrom and formed on the axis with a throughgoing hole;
   an insert between the walls and extending through the hole;
   interengaging formations on the insert and on the lower wall radially coupling the insert to the lower wall at an inner edge of the hole, the formations including axially oppositely open annular grooves formed on the insert and annular axially projecting bead formed on the lower wall at the inner edge and gripped axially between the grooves;
   an annular outer part on the insert between the upper and lower walls, and forming one of the grooves; and
   an inner part on the insert fixed to the outer part, extending through the hole, forming the other of the grooves, and axially pressing the inner edge of the lower wall against the outer part.

2. The diaphragm according to claim 1, further comprising
   locking formations coupling the inner part axially to the outer part.

3. The diaphragm according to claim 2, wherein the locking formations include complementary screw threads on the inner and outer parts.

4. The diaphragm according to claim 1, the diaphragm further comprising:
   radially interengaging formations axially coupling the upper wall to the insert.

5. The diaphragm according to claim 4, wherein the radially interengaging formations axially coupling the upper wall to the insert include a radially projecting lip on the wall and a complementary radially open groove on the insert into which engage the lip.

6. The diaphragm according to claim 1, wherein the insert is provided with a seat configured for connection to a piston.

7. The diaphragm according to claim 1, wherein the elastomeric body is made of a thermoplastic polymer.

8. The diaphragm according to claim 7, wherein the polymer is polyurethane.

9. The diaphragm according to claim 1, wherein the inner part is T-shaped and has an axially centered threaded stem engaged in the outer part and a radially projecting flange pressing the inner edge of the lower wall against the outer part.

10. The diaphragm according to claim 9, wherein the flange is flush with a lower face of the lower wall.

11. A diaphragm for a pump comprising:
    a one-piece elastomeric body centered on an axis and formed with
    an annular outer clamping edge,
    an annular flexible web extending radially inward from the outer edge, and
    a core joined by the web to the outer edge and formed in turn by an upper wall and a lower wall axially spaced therefrom and formed on the axis with a throughgoing hole;
    an insert between the walls and extending through the hole;
    axially interengaging formations on the insert and on the lower wall radially coupling the insert to the lower wall at an inner edge of the hole; and radially interengaging formations axially coupling the upper wall to the insert and including a radially projecting lip on one of the insert or the upper wall and a radially open groove on the other of the insert or the upper wall and receiving the lip.

* * * * *